(12) United States Patent
Bauer

(10) Patent No.: US 7,320,166 B2
(45) Date of Patent: Jan. 22, 2008

(54) SPEED SENSOR ENCODER WHEEL AND METHOD OF MAKING

(75) Inventor: Chad David Bauer, Fenton, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 320 days.

(21) Appl. No.: 10/874,838

(22) Filed: Jun. 23, 2004

(65) Prior Publication Data

US 2005/0283968 A1   Dec. 29, 2005

(51) Int. Cl.
   *B21B 1/46*      (2006.01)
   *H01F 7/06*      (2006.01)
(52) U.S. Cl. .................. 29/417; 29/602.1; 29/527.2; 29/527.3; 264/427; 324/166
(58) Field of Classification Search .............. 29/415, 29/417, 527.3, 602.1, 527.2; 324/174, 166, 324/207.22; 264/150, 171.12, 171.14, 171.15, 264/171.26, 427
See application file for complete search history.

(56) References Cited

U.S. PATENT DOCUMENTS

| | | | | |
|---|---|---|---|---|
| 4,345,363 A | * | 8/1982 | Leuchs et al. | 29/527.4 |
| 4,882,101 A | * | 11/1989 | Ohkita et al. | 264/474 |
| 5,894,004 A | * | 4/1999 | Wagner et al. | 264/40.1 |
| 6,278,269 B1 | * | 8/2001 | Vig et al. | 324/207.2 |
| 6,592,959 B2 | * | 7/2003 | Yamaguchi et al. | 428/66.6 |
| 6,602,571 B2 | * | 8/2003 | Yamaguchi | 428/66.6 |
| 7,019,515 B2 | * | 3/2006 | Sentoku | 324/207.25 |
| 2002/0078549 A1 | * | 6/2002 | Yamaguchi | 29/603.01 |
| 2004/0174160 A1 | * | 9/2004 | Tomioka | 324/207.22 |
| 2005/0007226 A1 | * | 1/2005 | Mizuta | 335/207 |
| 2005/0058376 A1 | * | 3/2005 | Oohira et al. | 384/448 |

FOREIGN PATENT DOCUMENTS

DE      10316176 A1    10/2003

\* cited by examiner

*Primary Examiner*—David P. Bryant
*Assistant Examiner*—Alexander P Taousakis
(74) *Attorney, Agent, or Firm*—Harness, Dickey & Pierce, P.L.C.

(57) ABSTRACT

A method of making an encoder for use in a speed sensor includes providing a metal tube. A material containing ferrite is then extruded over the metal tube to produce an encoder tube. The encoder tube is cut to a given length to form an encoder. The encoder is then magnetized within a magnetic field.

5 Claims, 3 Drawing Sheets

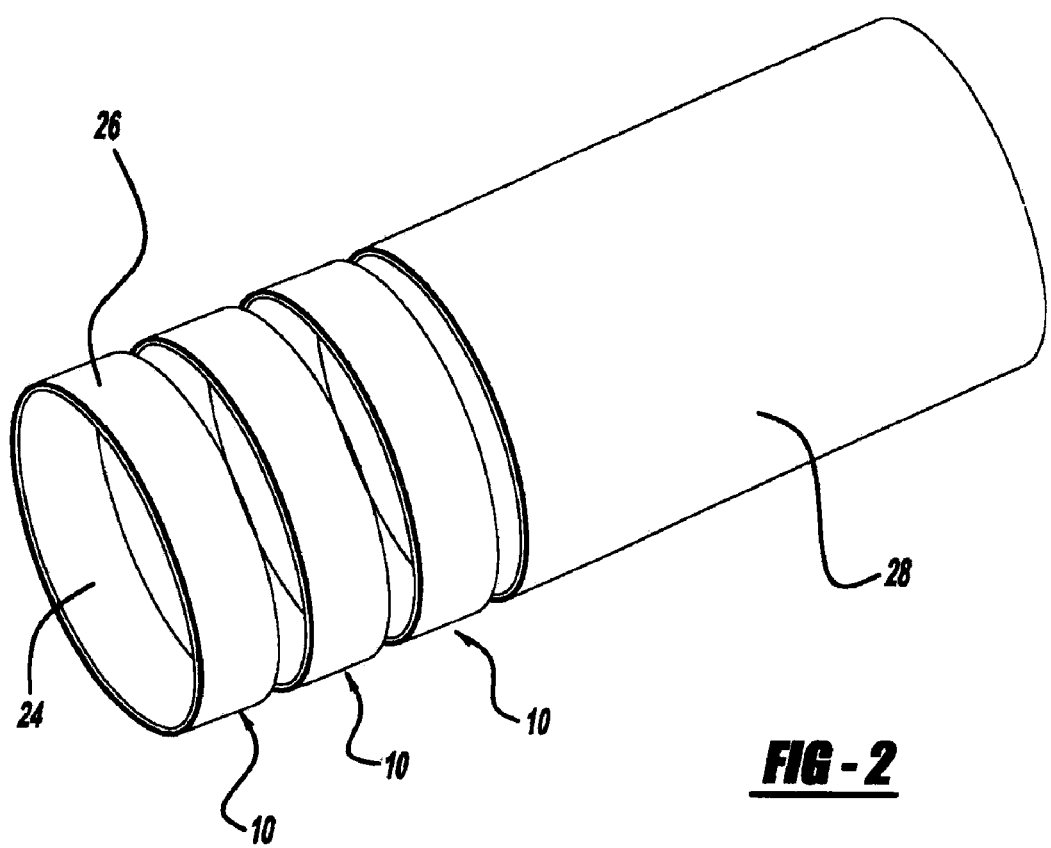

SPEED SENSOR ENCODER WHEEL AND METHOD OF MAKING

FIELD OF THE INVENTION

The present invention relates to speed sensors and more particularly to a speed sensor encoder wheel and a method of making same.

BACKGROUND OF THE INVENTION

Encoder wheels are used in speed sensor devices to determine the rotational speed of a component. For example, in motor vehicle applications, an encoder wheel often forms part of an anti-lock braking system for determining the rotational speed of the wheels. Other applications include coupling to engine crankshafts and within transmissions.

The encoder wheel typically includes an outer surface having magnetized ferrite therein. The ferrite is magnetized to form alternating north and south poles around the circumference of the encoder wheel. As the encoder wheel rotates, a magnetic sensor measures the change in the magnetic field of the alternating poles. From this alternating magnetic field, the rotational speed of the encoder wheel may then be calculated, and in turn the rotational speed of the component to which the encoder wheel is coupled is known. Alternatively, hall effect sensors, which do not use magnets, can also be utilized for detecting the rotational speed.

A conventional encoder wheel is produced from a tube of stamped steel with a ferrite loaded rubber compression molded thereon. However, in order to retain the ferrite loaded rubber, the stamped steel must have flanges or features to engage the rubber. This in turn enlarges the size of the encoder wheel. Moreover, such features increase the cost of manufacturing the encoder wheel and increase the costs of packaging. Finally, each encoder wheel is made separately and individually. This can lead to non-uniformity between encoders. Accordingly, it is an object of the present invention to provide an encoder wheel and method of making that addresses these limitations.

SUMMARY OF THE INVENTION

A method of making an encoder for use in a speed sensor includes providing a metal tube. A material containing ferrite is then extruded over the metal tube to produce an encoder tube. The encoder tube is cut to a given length to form an encoder wheel. The encoder wheel is then magnetized within a magnetic field.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a front perspective view illustrating the cutting of the encoder wheels of the present invention from an encoder tube.

DETAILED DESCRIPTION OF THE PREFERRED EMBODIMENTS

Figures 1, 1A:
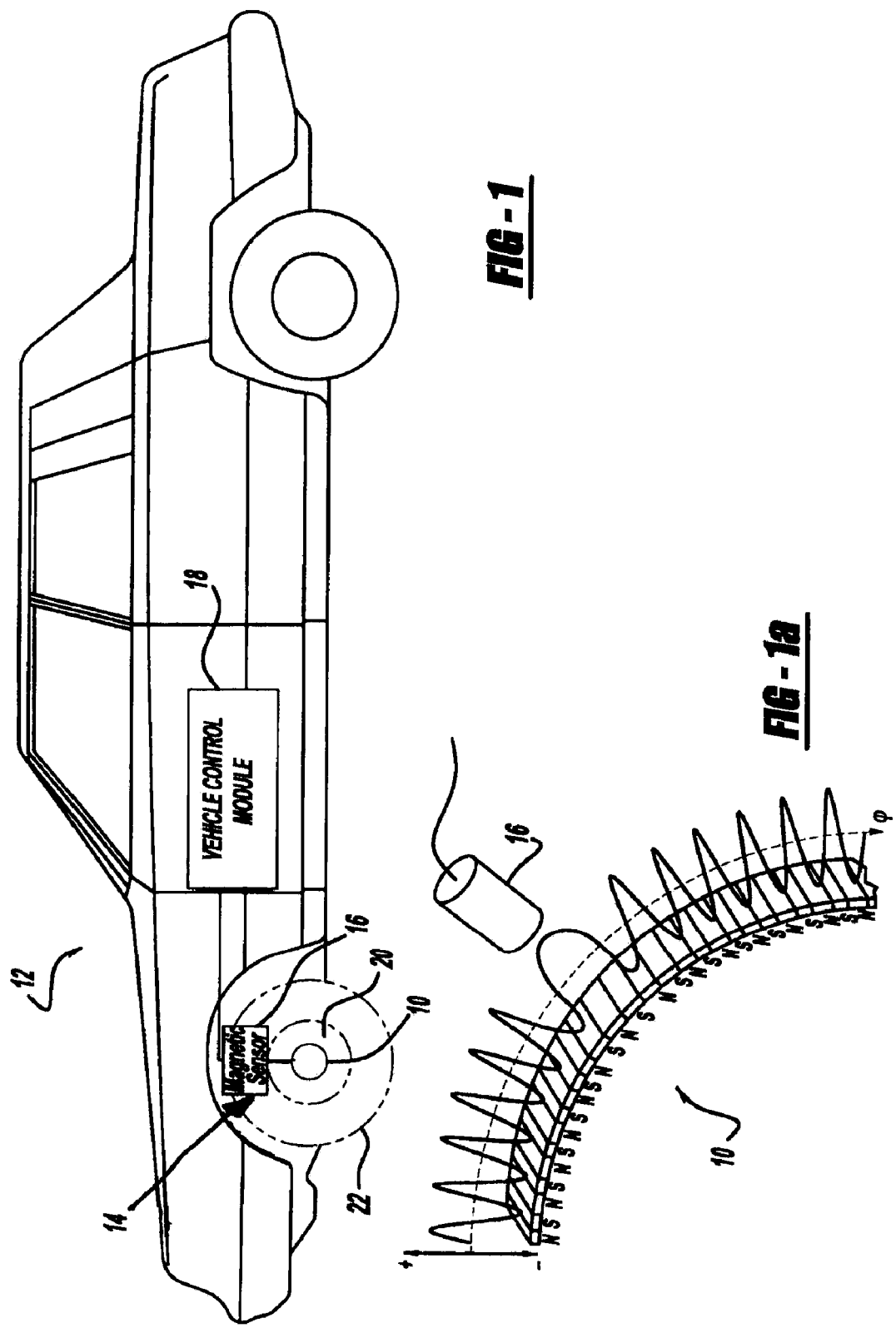
FIG. 1 is a schematic view of an exemplary motor vehicle having an encoder constructed according to the principles of the present invention.
FIG. 1a is an enlarged schematic view of a portion of an encoder wheel illustrating the magnetization on the encoder wheel.

With reference to FIG. 1 of the drawings, an encoder wheel 10 constructed according to the principles of the present invention is shown in operative association with an exemplary motor vehicle 12. In the particular example provided, the encoder wheel 10 forms part of an anti-lock braking system 14. The anti-lock braking system 14 further includes a magnetic field sensor 16 in communication with a vehicle control module 18. The encoder wheel 10 is preferably coupled to an axle shaft 20 that rotatingly drives a pair of wheels 22. With brief reference to FIG. 1A, the encoder wheel 10 is magnetized such that it includes a plurality of alternating north and south magnetic poles around its circumference. As the wheel 22 and axle shaft 20 rotate, the encoder wheel 10 in turn rotates. The magnetic sensor 16 senses the magnetic field emitted from the encoder wheel 10 as the magnetic field alternates between positive and negative magnetic fields as the encoder wheel 10 rotates. The vehicle control module 18 may then use this information to determine the rotational speed and/or rotational position of the encoder wheel 10, and therefore of the axle shaft 20 and the wheel 22. It should be appreciated that the encoder wheel 10 may be part of any magnetic speed sensing system, for example, as part of an engine speed sensing system where the encoder wheel 10 is mounted on a crankshaft or camshaft (not shown) so that the rotational speed and/or rotational position of the crankshaft or camshaft can be accurately determined for use in an engine control system.

Turning to FIG. 2, a plurality of encoder wheels 10 are illustrated, each being identical to another. The encoder wheels 10 are cut from a continuous length of encoder tubing 28, the manufacturing of which will be described in greater detail below. The encoder 10 includes an inner tube 24 and an outer tube 26 extruded overtop the inner tube 24. The inner tube 24 is preferably steel formed by an extrusion method. However, various other metals may be employed for the inner tube 24 and various other methods of making, such as stamping, may be employed.

As noted above, the outer tube 26 is an extruded material that encases the inner tube 24. The outer tube 26 is preferably rubber loaded with ferrite, although any extrudable material that can be loaded with ferrite may be employed, such as, for example, a plastic or thermoplastic material. In the preferred embodiment, the encoder wheel 10 includes an inner diameter of 40.45 mm and an outer diameter of 44.45 mm with a width of 20 mm. However, it should be appreciated that the encoder 10 may be of virtually any size without departing from the scope of the invention.

Figure 3:
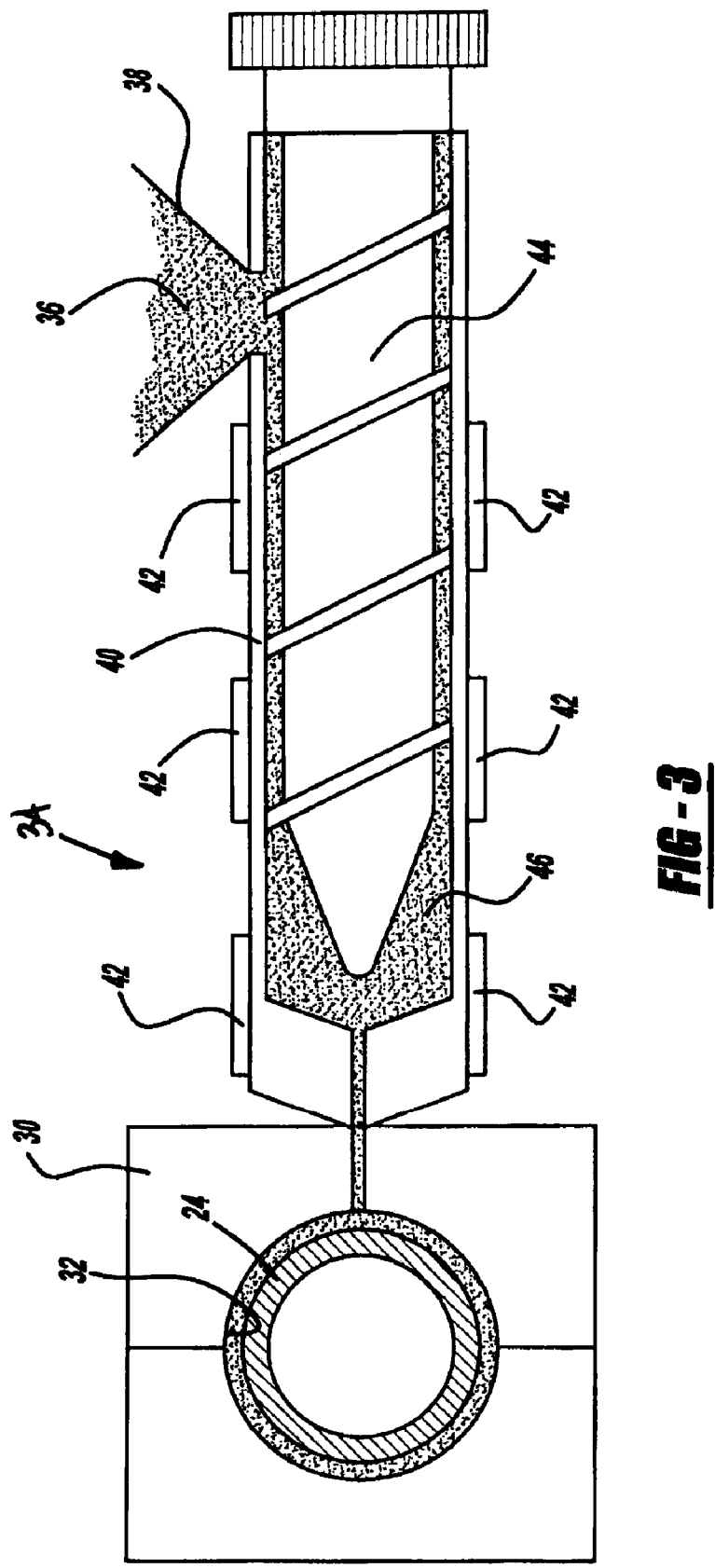
FIG. 3 is a schematic view of an exemplary extrusion apparatus for constructing the encoder tube of the present invention.

With reference to FIG. 3, the continuous length of encoder tubing 28 is formed using an extrusion process on the inner tube 24. For example, the inner tube 24 is pre-fabricated and fed into a mold 30. The mold 30 encases the inner tube 24 and defines a mold cavity 32. The mold cavity 32 in turn will define the outer surface of the outer tube 26 (FIG. 2). The mold 30 is coupled to an extrusion apparatus 34.

The extrusion apparatus 34 may take many forms without departing from the scope of the invention. Moreover, more than one extrusion apparatus 34 may be used with the mold 30 (e.g., an extrusion apparatus 34 at 120 degree intervals around the mold 30). In the particular example provided, a mixture of plastic granules and ferrite 36 are fed into a hopper 38. The hopper 38 feeds the plastic granules and ferrite 36 into a cylinder 40. The cylinder 40 is heated at an elevated temperature by heating elements 42 surrounding the cylinder 40. A screw mechanism 44 is located within the cylinder 40 and is rotatingly driven by a motor (not shown).

As the plastic granules 36 enter the cylinder 40, they are heated by the heating elements 42 and become semi-molten/molten plastic, generally indicated by reference numeral 46. The screw mechanism 44 as it rotates forces the mixed semi-molten plastic and ferrite 46 into the mold 30, thereby filling the mold cavity 32 surrounding the inner tube 24. The semi-molten/molten plastic and ferrite 46 then cools and forms the outer tube 26 (FIG. 2). The mold 30 may then be opened and the continuous encoder tube 28 removed therefrom. Alternatively, the inner tube 24 may be fed through the mold 30 in a continuous process without opening the mold 30. Once the encoder tube 28 has been formed, any number of encoders 10 may be cut from the encoder tube 28 at any desired width. Magnetization of the ferrite within the outer tube 26 to form alternating poles (see FIG. 1A) may be accomplished either before or after cutting of the encoder tube 28 to form the encoder wheels 10. The ferrite within the outer tube 26 is magnetized to preferably include 32 pole pairs all of equal widths, though any number of pole pairs may be used and may include asymmetrical widths.

By extruding the outer tube 26 onto the inner tube 24, the encoder wheel 10 finishes with a low profile (i.e., no flanges or bumps) that allows the encoder 10 to fit within small areas, including driveshafts. Moreover, extrusion of the outer tube 26 onto the inner tube 24 allows a large number of encoders 10 to be cut from a single encoder tube 28, thereby saving on manufacturing costs and increasing uniformity among encoders 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of making an encoder for use in a speed sensor, the method comprising:
    providing a metal tube;
    extruding a material containing ferrite over the metal tube to produce an encoder tube;
    cutting the encoder tube to a given length to form an encoder; and
    magnetizing the encoder within a magnetic field.

2. The method of claim 1, wherein the material is extruded over the metal tube within a mold.

3. The method of claim 1, wherein the material is in a semi-molten state when extruded over the metal tube.

4. The method of claim 1, wherein the material containing ferrite is selected from one of the set of rubber, plastic, and thermoplastic.

5. The method of claim 1, wherein providing the metal tube includes extruding a metal to form the metal tube

* * * * *